INVENTORS
ARTHUR S. CHU
JOSEPH H.F. LOOZEN

BY
*Jay P. Friedman*
ATTORNEY

United States Patent Office 3,632,652
Patented Jan. 4, 1972

3,632,652
PURIFICATION OF PERHALOACETONES
Arthur S. Chu, Morristown, and Joseph H. F. Loozen, Morris Plains, N.J., assignors to Allied Chemical Corporation, New York, N.Y.
Filed Mar. 14, 1968, Ser. No. 713,129
Int. Cl. C07c 49/16
U.S. Cl. 260—593 H      29 Claims

ABSTRACT OF THE DISCLOSURE

Halogen acid impurities are removed from perhaloacetone mixtures by hydrating the perhaloacetone mixtures and neutralizing the hydrated mixtures with a neutralizing agent of the formula MOH, wherein M is a member selected from the group consisting of an alkali metal and an alkaline earth metal under controlled conditions such that the pH of the mixture during the neutralization step is maintained between certain critical limits. The preferred neutralizing agent is NaOH. The subject neutralizing agents effect removal of halogen acids to high specification standards without causing substantial decomposition of the perhaloacetones. Gross amounts of halogen acids as well as organic impurities are removed from the perhaloacetone masses during the hydration step. The neutralization step removes residual amounts of halogen acid impurities to high specification standards. Anhydrous perhaloacetone product can be recovered from the hydrated mixture by dehydration with a suitable dehydrating agent such as $H_2SO_4$. In an optional embodiment HF impurities can first be converted to HCl impurities by treatment of the perhaloacetone mass with $CaCl_2$. Neutralization is then effected on hydrated masses in which the halogen acid impurities are essentially HCl.

CROSS-REFERENCES TO RELATED APPLICATIONS

Co-pending application of William J. Cunningham and Cyril Woolf, entitled "Fluoro Compounds and Synthesis Thereof," Ser. No. 591,034, filed Oct. 31, 1966, which is a continuation-in-part of co-pending application of William J. Cunningham and Cyril Woolf, entitled "Fluoro Compounds and Synthesis Thereof," Ser. No. 297,220, filed July 24, 1963, which is in turn a continuation-in-part of co-pending application of William J. Cunningham and Cyril Woolf, entitled "Fluoro Compounds and Processes for Making Same," Ser. No. 263,430, filed Mar 7, 1963.

Co-pending application of William J. Cunningham and Cyril Woolf, entitled "Purification of Perhaloacetones," Ser. No. 580,860, filed Sept. 21, 1966, which is a continuation-in-part of co-pending application Ser. No. 297,220, supra.

BACKGROUND OF THE INVENTION

This invention relates to the purification of perhaloacetones or mixtures containing the same together with organic and inorganic impurities, particularly halogen acid impurities.

Perhaloacetones of the formula $C_3OCl_xF_{6-x}$, wherein $x$ is a value from 0 to 1, and mixtures thereof, hereinafter referred to as "the subject FK's," or simply as "FK's," are known compounds and are known to be useful as intermediates for the preparation of a wide variety of useful chemical compounds such as perhaloacetic acids, perhalogenated alcohols, chlorofluorocarbons, halogenated olefins and halogen containing resins such as halogen containing polycarbonates.

The subject FK's embrace the following two species shown in Table I:

TABLE I

| FK | Chemical name | Chemical formula | Boiling point, °C. |
|---|---|---|---|
| 6FK | Hexafluoroacetone | $CF_3 \cdot CO \cdot CF_3$ | −27.4 |
| 5FK | Chloropentafluoroacetone | $CClF_2 \cdot CO \cdot CF_3$ | 7.8 |

The subject FK's may be prepared, for example, by the reaction of hexachloroacetone with HF in the presence of catalysts, such as chromium oxides or antimony halides. Such a procedure is described more in detail, for example, in U.S. Pat. 3,257,457, to Louis G. Anello and Cyril Woolf, wherein a catalyst consisting of dichromium trioxide is employed.

Conversion of hexachloroacetone to hexafluoroacetone is inevitably incomplete in one-pass operations. Consequently, the crude FK product mixture normally comprises a mixture of FK's having anywhere from 1–6 fluorine atoms, together with considerable amounts of halogen acids, i.e. unreacted HF and by-product HCl, and minor amounts of organic by-products, such as phosgene and halocarbons, e.g. 1,1,2 - trichlorotrifluoroethane and 1,2-dichlorotetrafluoroethane. To some extent the fluorination reaction can be controlled to produce predominant amounts of the higher fluorinated 5FK and 6FK products. Additionally, the various FK products may be separated from one another by ordinary distillation means. In any event, halogen acid impurities will be present in significant amounts either in the crude perhaloacetone masses obtained from the fluorination reaction of hexachloroacetone with HF or in individual FK components, such as 5FK and 6FK which have been separated from one another by distillation. Distillation will not separate halogen acid impurities from FK's.

In the prior art, it is known that non-halogenated ketones and chlorinated ketones may be readily purified by distillation to remove organic impurities and by neutralization with various bases to remove inorganic impurties such as halogen acids.

Purification of the subject FK's, however, has presented problems and considerations not applicable to the purification of non-halogenated ketones or chlorinated ketones.

Although, as indicated above, the various FK's have widely separated boiling points and may be readily separated, one from another, by distillation; some of the organic impurities normally found in the crude FK mixtures have boiling points which are too close to the boiling points of some of the FK's to permit ready separation by distillation.

Furthermore, unlike non-halogenated ketones and chlorinated ketones, the subject FK's are known to form complexes and azeotropic systems with halogen acids (hereafter designated as HY acids or simply as HY).

Some of the complexes which are believed to be formed between the HY acids and the subject FK's include the following:

(1) Hexafluoro - 2 - chloroisopropanol, decomposition point 19° C., M.P. −47° C., from 6FK and HCl.

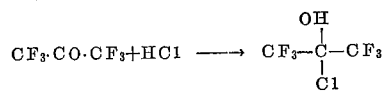

(2) Heptafluoroisopropanol, decomposition point 14°–16° C., M.P. −56° C., from 6FK and HF.

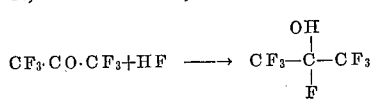

(3) 1 - chlorohexafluoroisopropanol, decomposition point 32°–33° C., M.P. −82° C., from 5FK and HF.

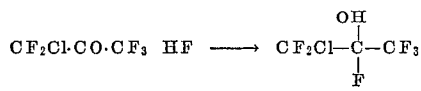

(4) 2 - (1 - chlorohexafluoroisopropoxy) - 1 - chloropentafluoroisopropanol, decomposition point −1° C., from 5FK and HF.

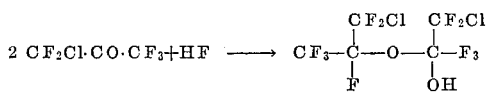

Such FK complexes thus formed are in equilibrium with the HY and with the FK's, so that reaction mixtures obtained from the fluorination of hexachloroacetone will often contain mixtures of the subject FK's, their HY complexes and free HY, the proportions of each varying considerably with the temperature. At low temperatures the equilibrium is such that the complexes form the major part of the mixture. At higher temperatures, the equilibrium changes and predominant amounts of FK's and HY may be present. However, attempts to completely decompose the complexes by increasing the temperature have proven impractical.

Effective removal of complexed HY from FK reaction mixtures depends upon the ability to rupture the complexes and free the HY so that it may be released from the FK mixtures.

There is disclosed in co-pending application of William J. Cunningham and Cyril Woolf, Serial No. 580,860, mentioned supra, means for breaking FK·HY complexes and freeing FK masses from HY and other impurities by forming hydrates of the FK's contained in crude FK masses, desorbing volatilizable constituents from the hydrates and reconverting the purified hydrates to the corresponding FK's. Such procedure, referred to hereafter as "the hydrate procedure," represents a useful and effective means for effecting purification of the type indicated.

It has been found, however, that although significant purification of the crude FK's can be effected by the hydrate procedure alone, the highest specification products with this route are obtainable only by proceeding through the monohydrates or as near thereto as possible. Preparation and use of the monohydrates, however, particularly in continuous operations, entails some process disadvantages such as low reaction and absorption rates. Current commercial standards for FK products for ordinary purposes call for no more than 100 parts per million of HCl and no more than 500 parts per million of HF. For specialized purposes, even higher specification standards are required, for example, in the order of about 10 parts per million of total HY impurity.

A number of chemical agents have been employed to effect rupture of the FK·HY complexes in order to release trapped HY. It is apparent that the selected agent must not only operate effectively to release essentially all of the trapped HY; but, at the same time it must not attack the FK and result in loss of significant quantities of the valuable FK product.

One chemical agent in common use for this purpose is NaF. Extensive experimentation with NaF has demonstrated, however, that this is not a practical way to remove HY, particularly HF. It has been found that use of NaF leads to chemi-absorption of HF at some temperatures and desorption at other temperatures making temperature and process controls difficult. The end result is incomplete removal of HY.

The prior art points away from the applicability of alkali neutralization, used in the non-halogenated ketone or chlorinated ketone art, to the purification of FK's. This is because alkalis are known to react with the FK's and would therefore be expected to result in excessive losses of the FK products. For example, a caveat against use of alkalis to remove acids from FK mixtures is given in British Pat. 976,316 (p. 4, col. 1, lines 4–24). U.S. Pat. 2,827,485 discloses that the FK's react with alkalis such as alkali metal hydroxides, e.g. NaOH, to effect scission and decomposition of the FK molecule.

SUMMARY OF THE INVENTION

It is an object of this invention to provide an improvement on the hydrate procedure for purifying crude FK mixtures, particularly from HY impurities.

It is a particular object of the invention to provide a continuous type method for the purification of crude FK's, such as produced by the catalyzed reaction of hexachloroacetone with HF, to anhydrous, high specification grades of FK products or FK product mixtures.

A specific object of the invention is to provide a means for purifying 5FK.

Another specific object of the invention is to provide a means for purifying 6FK.

It is another specific object of the invention to provide an improved method for purifying crude FK masses to 10 parts per million or less total HY.

Yet another object of the invention is to provide a method for purifying crude FK masses to a specification grade of 10 p.p.m. or less of halogen acids while, at the same time, achieving good yields of the FK product.

Other objects and advantages of the invention will become apparent from the following description.

It has been found that the objects of the invention may be accomplished by hydrating HY containing FK masses substantially as described in co-pending application of Cunningham et al., Ser. No. 580,860, followed by neutralizing the hydrated FK masses with a neutralizing agent of the formula MOH, wherein M is a member selected from the group consisting of an alkali metal and an alkaline earth metal, provided that certain critical conditions are carefully maintained and controlled. These conditions involve maintaining the pH of the reaction mixture during the neutralization between about 3.5 and about 7.0. It has been found that if the pH of the reaction mixture during neutralization with these materials is permitted to substantially exceed about 7.0 then, indeed, attack of and resulting decomposition of the subject FK's takes place with significant loss of FK values. On the other hand, if the pH is permitted to fall substantially below about 3.5, significant neutralization of the HY acids cannot be effected and specification standards for purified FK, particularly with respect to HF content, cannot be achieved. The subject neutralizing agents rupture FK·HY complexes present and react with HY, which is liberated, to form salts which can be removed from the system. The ability to neutralize HY acids associated with these FK materials, without undue accompanying loss of FK values, was surprising in view of the known ready reactivity of alkalis, particularly NaOH, with the subject FK's. The amount of neutralizing agent added should be sufficient to react with substantially all of the HY acids present.

Specific alkali metal hydroxides suitable for use in accordance with the invention procedure include any of the well known alkali metal hydroxides, for example NaOH, KOH, LiOH, and the like. Likewise, the alkaline earth metal hydroxides which may be used in accordance with the invention procedure are a well-known class of materials and include, for example, $Ca(OH)_2$, $Ba(OH)_2$, $Mg(OH)_2$, and the like.

The subject hydroxide neutralizing agents are preferably fed to the purification system in aqueous solution. They may, however, if desired, be fed to the purification system in the form of solids which, together with the water present in the system, will generate the subject hydroxides in situ. The alkaline earth metal hydroxides, by way of example, may be generated in situ by feeding the corresponding solid alkaline earth metal oxides, e.g. CaO, BaO and MgO, to the system.

As a class, the alkali metal hydroxides, particularly NaOH, are preferred.

In the preferred embodiment, to be discussed more in detail hereafter, a crude FK mass is subjected to distillation to isolate a fraction consisting predominantly of 5FK, 6FK, or a mixture thereof. This fraction is then subjected to hydration to remove gross quantities of organic and inorganic impurities and form a partially purified hydrated mixture. The partially purified hydrated mixture is then directly neutralized with an aqueous solution of NaOH to remove residual amounts of halogen acids to high specification standards.

In another advantageous embodiment, a pretreatment step for HF containing crude FK masses is employed which comprises converting substantial amounts of the HF present in the crude FK masses to HCl. Hydration and neutralization is then carried out as described above. This pretreatment step is based upon the observation that HCl is more efficiently removed by hydration than HF. Having a greater proportion of HY impurities present as HCl, as opposed to HF, enables the relative selective purification action of the hydration step to be utilized to maximum advantage.

The present invention provides a purification technique capable of achieving high specification standards of FK while, at the same time, not suffering from the disadvantages possessed by the hydrate procedure, such as those of requiring long reaction and absorption periods in those embodiments necessary to achieve highest specification standards.

DETAILED DESCRIPTION OF THE INVENTION

The combination

The invention in its broadest aspects involves use of a neutralizing agent of the formula MOH, wherein M is a member selected from the group consisting of an alkali metal and an alkaline earth metal, under critically controlled conditions, to purify hydrated HY containing FK mixtures.

As mentioned previously, however, other steps may be included in the purification scheme in order to achieve special results or to achieve flexibility in operation. For example, the hydration step may be controlled to produce stable or unstable hydrates or mere water solutions. The hydration step may optionally include a desorption step to improve results. Anhydrous purified FK may be recovered by a dehydration step. Dehydration may be readily effected with desiccating agents. As already mentioned, it is advantageous to include a pretreatment step for converting HF in the crude FK mass to HCl.

A particular purification scheme within the scope of the invention may be set up to operate in continuous or batch-type fashion.

THE INDIVIDUAL PROCEDURAL STEPS OF THE INVENTION

Part A—The hydration step

The hydration step may be conducted substantially as described in co-pending application of William J. Cunningham and Cyril Woolf, Ser. No. 580,860, mentioned supra. The pertinent subject matter of Ser. No. 580,860 is hereby incorporated by reference.

Essentially, the hydration step comprises contacting the crude FK mixture with liquid-phase water in an amount equivalent to provide a total of at least one mol of water per mol of FK, while maintaining temperature such that any free water present is in liquid phase, to evolve off quantities of HY and form a more purified reaction mass containing recoverable FK hydrate. Water may be added in the form of an FK hydrate.

The addition of water to the FK/HY mixture causes rupture of FK/HY complexes and frees substantial amounts of HY, otherwise entrained, which may then be evolved off as a gas. Rupture of FK/HY complexes takes place in favor of FK hydrates which are formed or when reaction masses containing recoverable perhaloacetone hydrates are formed. Residual amounts of HY associated with the FK's or FK hydrates may then be removed by neutralization, as described in step B.

Since impurities are evolved off upon formation of a subject FK·hydrate or upon formation of a reaction mass from which such a hydrate is recoverable; the reaction mass obtained by the reaction of a subject FK with $H_2O$ will be referred to as "the purified reaction mass."

The term "recoverable FK hydrate" refers to a reaction mass which is formed between a subject FK and $H_2O$ which contains an amount of $H_2O$ which is in excess of that required to form an identifiable hydrate and from which mass an identifiable hydrate is recoverable.

For the present purposes, the term "hydrate" will be understood as referring generically to either "identifiable hydrates" or "recoverable hydrates."

The useful identifiable hydrates which are known to be formed between $H_2O$ and 5FK and 6FK are shown in Table II.

TABLE II

| Hydrate | Melting point, °C. | Boiling point, °C. |
|---|---|---|
| $6FK \cdot 3H_2O$ | | 106 |
| $6FK \cdot H_2O$ | 46 | [1] 46 |
| $5FK \cdot 3H_2O$ | | 105 |
| $5FK \cdot H_2O$ | 26.5 | [1] 26.5 |

[1] Disassociates.

The above reported hydrates of 5FK and 6FK, including certain recoverable hydrates may be represented generically as follows: $C_3OCl_xF_{6-x} \cdot nH_2O$, wherein $x$ is 0 or 1 and $n$ has a value from 1 to 3.

Some of these hydrates, particularly $5FK \cdot H_2O$ and $6FK \cdot H_2O$, are true compounds, whereas the others, $5FK \cdot 3H_2O$ and $6FK \cdot 3H_2O$, are actually constant boiling mixtures of the components in the indicated proportions.

$5FK \cdot H_2O$ and $6FK \cdot H_2O$ form solutions or slurries with less than 2 additional mols of $H_2O$. Such solutions or slurries will be characterized herein as a hydrate, i.e. as $FK \cdot xH_2O$ wherein $x$ represents the proportionate number of mols of water present.

$5FK \cdot 3H_2O$ and $6FK \cdot 3H_2O$ form liquid mixtures with excess $H_2O$. The trihydrates are not identifiable in such mixtures but are formed and are recovered by distillation of the mixtures. Since $5FK \cdot 3H_2O$ and $6FK \cdot 3H_2O$ each possess about the same boiling point, they are not separable from one another by ordinary distillation.

$5FK \cdot 3H_2O$ and $6FK \cdot 3H_2O$ themselves, are stable, constant boiling mixtures. On the other hand, $5FK \cdot H_2O$ and $6FK \cdot H_2O$ are unstable compounds and disassociate upon heating to form the corresponding free FK and the stable hydrate of the corresponding FK. If an unstable hydrate is generated in the hydration step, it will be converted to a stable hydrate in the neutralizer upon contact with water added to the system with the neutralizing agent or with water generated as by-product in the neutralization reaction.

Formation of the hydrates can be carried out under a wide range of temperatures which may vary between the melting point and boiling point of the particular hydrate involved. For the present purposes, it is preferred that temperatures in the range of about 40° C.–70° C. be employed. In this connection it will be noted that if the nature of the feed and the amount of water provided is such as to cause formation of $5FK \cdot H_2O$ or $6FK \cdot H_2O$, then the preferred temperature range will include those temperatures which will cause immediate disassociation of these materials. This is not a deleterious result, however, as the separation of HY will still take place and a purer form of anhydrous FK as well as FK trihydrate will be generated and may be further treated.

The pressure which should be employed during the hydration step is not critical. Super-atmospheric pressures, however, would make it more difficult to evolve off freed HY gas and other volatilizable constituents and accordingly is not preferred. Atmospheric pressure is the most practical and thus is preferred.

It has been found that the amount of water which is supplied to the system is important. At least one mol of water per mol of FK should be employed to get significant benefits from the hydration step. If unstable hydrates such as $5FK \cdot H_2O$ and $6FK \cdot H_2O$, are to be avoided, the mol ratio of water contacted with the FK should be greater than about 2.8:1. When molar ratios of $H_2O/FK$ exceed about 2.8:1, substantial amounts of the FK trihydrate will be formed. A precise 1:1 molar ratio is not preferred since the solid monohydrates which are formed are difficult to handle. Accordingly, in operation, it is preferred to employ at least a 1.1:1 molar ratio $H_2O/FK$. If substantial amounts of unstable hydrates are formed in a system which is designed for stable hydrates, as would be the case if less than about 2.8 mols of water per mol of FK are employed, large amounts of FK will be lost due to disassociation of the monohydrate when formed and heated past its disassociation point.

It has further been found, when working with $$5FK \cdot 3H_2O$$

and $6FK \cdot 3H_2O$, if large excesses of water are provided, that the residual HY content of the resulting hydrate or solution containing recoverable hydrate will be higher. This is because azeotropic mixtures will be formed between the HY present and $H_2O$ which is in excess of three mols per mol of FK in the mixture. Such $HY/H_2O$ azeotropes have boiling points of about 111° C. which are higher than the boiling points of either $5FK \cdot 3H_2O$ or $6FK \cdot 3H_2O$ (105° C.–106° C.). The HY will accordingly remain thus associated in the system. Thus, although significant amounts of residual acids may be removed, even when large excesses of water are present, for the reason given above, the provision of unduly large excesses of $H_2O$ should be avoided. Another reason to avoid the presence of unduly large excesses of $H_2O$ is that large excesses of water will require large quantities of dehydrating agent for reconstitution of the FK product. Hence, although it is not critical, it is preferred that not more than about 5 mols of water per mol of FK should be employed. It has been found that, for superior results, between about 2.8–3.5 mols of water per mol of FK should be present. The preferred molar ratio of water to FK in the hydration step is between about 3.1–3.2:1.

During or subsequent to the hydration step, greater separation of HY and organic impurities may be achieved by heating the hydrates (or recoverable hydrates) to volatilize therefrom volatile constituents which boil below about 105° C. at atmospheric pressure. When stable hydates such a $5FK \cdot 3H_2O$ and $6FK \cdot 3H_2O$ are employed, the desorption is carried out with no change in composition of the hydrate. When unstable hydrates, such as $5FK \cdot H_2O$ and $6FK \cdot H_2O$ are subjected to the desorption step, the unstable hydrates disassociate above their disassociation temperatures to form the corresponding trihydrates and corresponding anhydrous FW's. In order to achieve any significant desorption effect, the temperature of the hydrate should be raised to at least about 70° C. but should not of course be permitted to exceed the boiling point of the hydrate. Desorption would be facilitated by operating under sub-atmospheric conditions, however, atmospheric pressure is quite satisfactory and more practical and is therefore preferred.

Part B—The neutralization step

As described above, the neutralizing agent may be added to the system in liquid or solid form. Preferably it is added as a liquid, or an aqueous solution. The concentration of the solution is not critical.

Temperatures significantly above about 100° C. should be avoided to avoid undue losses of FK by decomposition. Generally, temperatures between about 5–40° C. are preferred with temperatures in the order of room temperature (about 25° C.) being optimum.

Operating pressures for the neutralization step are not critical, and may be atmospheric, sub-atmospheric or super-atmospheric.

The neutralization reaction can conveniently be carried out by passing an aqueous addition of the neutralizing agent into the hydrated FK mixture.

Control of the pH of the mixture of hydrated FK and neutralizing agent may be accomplished by carefully regulating the quantity of neutralizing agent supplied to the neutralization system. This may be accomplished with conventional equipment with automatic control such as by arranging for a feed control valve to be operated responsive to a calomel and glass electrode pH controller. The pH of the neutralization system will be, to a large extent, a function of the acid values contributed by the HY impurities of the FK hydrated mixture and of the basic values contributed by the neutralizing agent. The amount of neutralizing agent required will, of course, vary with the concentration of the solution which is used, as well as with the pH values of the system involved.

NaOH is commercially available in 50% aqueous solution, which may be conveniently employed in the invention process. More or less concentrated solutions may be prepared and employed, however, and the quantity of the neutralizing solution will then, of course, have to be adjusted accordingly to maintain the pH at the desired level. Eventually, of course, a total amount of neutralizing agent will be supplied to the system which is at least stoichiometrically sufficient to react with all the HY values present. It will be apparent that large concentrations of neutralizing agent in the system will cause the pH to increase and possibly exceed the upper desired limit of 7.0. In such an event the reaction, for the reasons described above, will be adversely affected. For equally apparent reasons, if the concentration of neutralizing agent is too low, the pH may possibly exceed the lower desired limit of 3.5, in which case insufficient removal of HY impurities, particularly HF, can be expected.

A preferred operating pH range during the neutralization step is between about 3.5–6.0 with the optimum range being between about 5.0–5.5.

The chloride and fluoride salts formed during the neutralization process may be removed from the system by any suitable means, such as for example, filtration and water washing.

The neutralization step may be carried out continuously or batchwise. If a batchwise operation is employed, the neutralization may be conveniently carried out by regulating the quantity of neutralizing agent added to the reaction mass. If a continuous operation is employed, the neutralization may be conveniently carried out by regulating the relative rates of addition of the neutralizing agent and the partially purified hydrated reaction mass to the neutralization zone.

Part C—The dehydration step

If anhydrous FK product is desired, it is necessary to dehydrate the neutralized FK material. A certain amount of water, of course, has been supplied to the system in the hydration step. Additional amounts of water may have been added to the system as by-product from the neutralization reaction. A dehydration step may thus be employed either to remove the water of formation of the neutralization reaction or to remove the water of hydration of the FK's.

Dehydration may be conveniently effected with a suitable desiccating agent, such as concentrated $H_2SO_4$, $P_2O_5$ or $SO_3$. Any desiccating agent capable of removing all the $H_2O$ associated with the FK including any chemically combined $H_2O$ may be employed. The preferred desiccating agent is concentrated $H_2SO_4$ (about 80–100%).

The dehydration step is preferably but not necessarily carried out at temperatures above the boiling point of the FK's in the hydrated mixture and should be carried out below the point at which undue decomposition of the anhydrous FK's will take place (about 160° C.) or below the the point at which the desiccating agent will vaporize. ($H_2SO_4$ undergoes some degree of vaporization at about 150° C.) The preferred operating temperature range for dehydration is between about 90–100° C.

Pressures which should be maintained during the dehydration step are preferably atmospheric, although superatmospheric pressures and sub-atmospheric pressures could be used. Subatmospheric pressure is more or less impractical, however, since it would increase the vapor pressure of the $H_2SO_4$. Likewise, exceedingly high pressures would be impractical since this would occasion the use of higher operating temperatures, thereby complicating decomposition and corrosion factors. Generally, pressures in the range of about 0–100 p.s.i.g. could be employed satisfactorily. Atmospheric pressure is the most practical, however, and for this reason is preferred.

Part D—The hydrate distillation step

Subsequent to neutralization it is necessary to subject the neutralized hydrated FK material to a distillation step to separate dissolved quantities of precipitated chloride and fluoride salts present. These salts are soluble in water and in the trihydrates and, unless removed from the system before the dehydration step, will react with dehydrating agent, particularly if concentrated $H_2SO_4$ is employed, to regenerate undesired HY values. Trihydrates and water are taken off as distillate from the distillation unit with the precipitated salts remaining in the heel. This distillation step may be used on the filtrate after bulk quantities of chloride and fluoride values have been removed, such as by filtration, or it may be used to separate trihydrate water mixtures from all chloride and fluoride values with the distilland subjected to filtration to recover FK values. The preferred mode of operation for the distillation step is to ensure that neutralized FK material in the still is not evaporated to dryness. Decomposition with accompanying loss of FK values could result in such an event.

Part E—The HF pretreatment step

The pretreatment step for converting HF in the HY containing FK mixture to HCl, discussed supra, may be carried out by contacting the FK mixture with any chemical agent capable of accomplishing this result. The chemical agent chosen should, of course, not react with the FK present.

It has been found that metal chlorides, particularly alkaline earth metal chlorides and preferably $CaCl_2$, are effective for this purpose. The metal chlorides should be used in anhydrous form.

Operating temperatures for the pretreatment step are not absolutely critical. A good working range is from about 100–260° C., with preferred temperatures being in the lower portion of that range.

Pressures are not critical but atmospheric pressure is preferred.

DESCRIPTION OF THE PREFERRED EMBODIMENTS AND EXAMPLES

The following examples illustrate preferred embodiments of the invention in that they describe preferred purification schemes. It is to be understood that such examples are not to be taken as limitative of the scope of the invention and that modifications of the schemes, including rearrangement or elimination of certain steps and components, may be devised by those skilled in the art without departing from the scope and spirit of the invention. Parts and percentages are by weight unless otherwise indicated.

EXAMPLES 1–6

Figure 1:
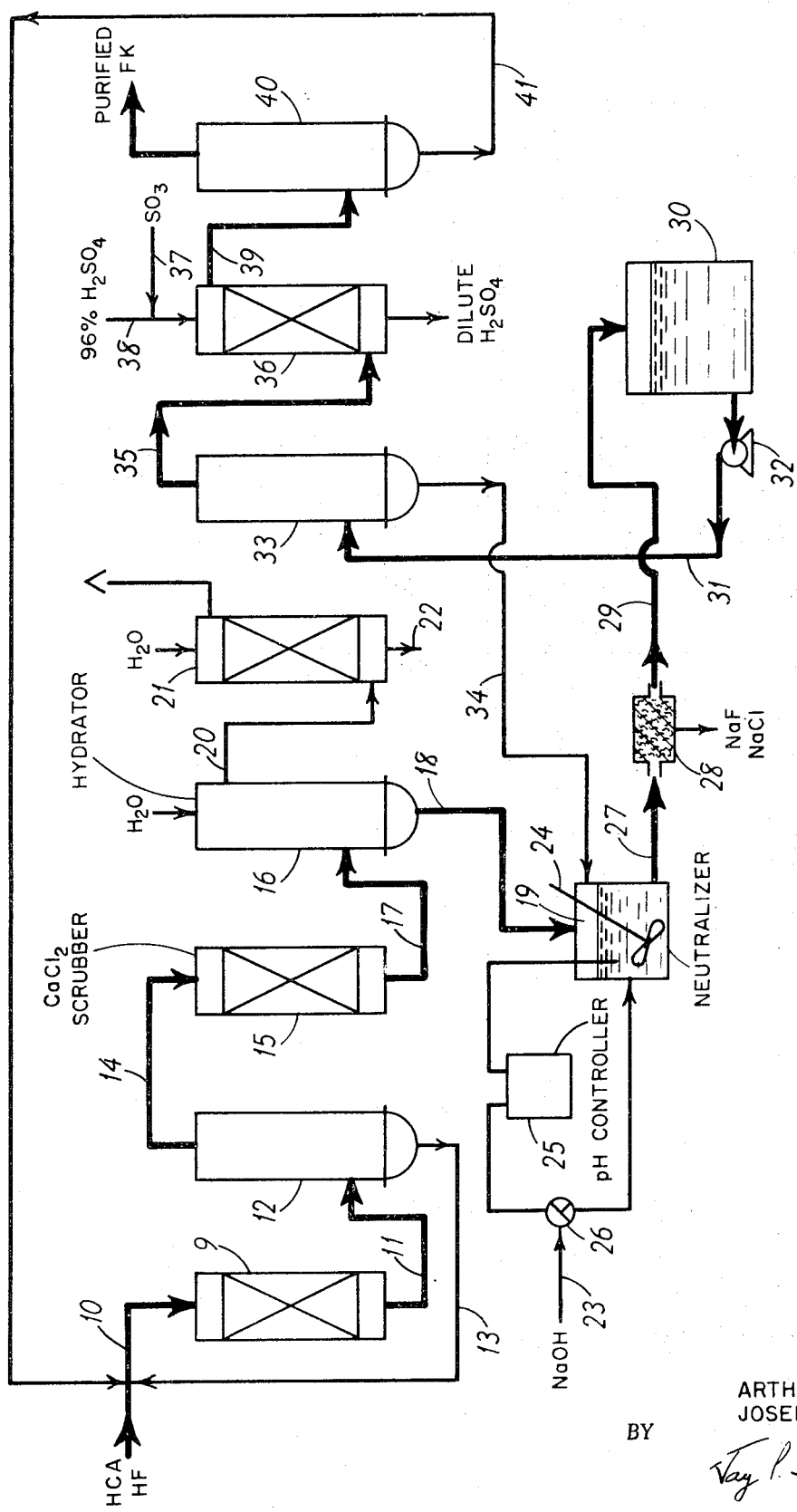
FIG. 1 is a schematic diagram illustrating the embodiment of the invention in which an HY containing 5FK/6FK mixture is purified by a procedure which includes as essential steps the following: pretreating an HY containing 5FK/6FK mixture to convert gross amounts of HF to HCl, hydrating the FK mixture to an FK·3H$_2$O mixture, neutralizing the FK·3H$_2$O mixture, filtering out precipitated salts from the neutralized FK·3H$_2$O mixture, distilling the filtrate and dehydrating the distillate.

Referring to FIG. 1 of the drawings, a synthetic, crude FK hydrate mixture is prepared by the following procedure. Hexachloroacetone (HCA) and HF are fed to FK reactor 9 through pipe 10, wherein under the influence of a $Cr_2O_3$ catalyst, a product mixture comprising essentially a mixture of 5FK and 6FK is produced. The FK mixture is fed through pipe 11 to recycle still 12 for the separation of 5FK and 6FK material from underfluorinated FK material (4FK and below). The underfluorinated material is recycled through pipe 13 to FK reactor 9 for further fluorination. The HY containing 5FK and 6FK mixture is withdrawn from the top of recycle still 12 through pipe 14 and is fed to calcium chloride scrubber 15. The scrubber contains pellets of anhydrous $CaCl_2$. Temperature in the scrubber is maintained at about 100° C. Pressure is atmospheric. Contact time is about 200 seconds. At the end of this period substantial amounts of the HF present are converted to HCl. The $CaCl_2$ scrubbed FK mixture, in which substantial amounts of HF have been converted to HCl, is fed to hydrator 16 through pipe 17 wherein it is reacted, at temperatures between about 40–70° C., with sufficient water to form corresponding FK trihydrates. The hydrated FK mixture is withdrawn from hydrator 16 through pipe 18 and is then fed to neutralizer 19. The hydrated FK mixture leaving hydrator 16 has approximately the following make-up:

| | Percent |
|---|---|
| 5FK and 6FK | 70 |
| HCl | 4.79 |
| HF | 0.04 |
| $H_2O$ | 25.17 |

Off-gases from the hydrator, comprising large quantities of halogen acids and organic impurities, being only moderately soluble in the FK trihydrates at the temperatures maintained in the hydrator, pass through the FK trihydrates and leave the hydrator through pipe 20 hereby they are fed to water scrubber 21. The scrubbed off-gases are vented off to the atmosphere. Aqueous HY is recovered from water scrubber 21 through pipe 22.

The hydrated FK material is contacted with a 50% aqueous solution of NaOH in neutralizer 19. The NaOH solution is fed to neutralizer 19 through feed pipe 23. A mechanical stirrer 24 is provided in neutralizer 19 to agitate the contents of the neutralizer. pH controller 25 continuously measures the pH in neutralizer 19 and automatically regulates feed control valve 26 to control the amount of NaOH fed to neutralizer 19 through feed pipe 23 so that pH in the neutralizer is maintained at about 5.5. The neutralization reaction is somewhat exothermic. Temperatures in the neutralizer are from about 25–35° C.

The neutralized reaction mixture from neutralizer 19 is withdrawn through pipe 27 and is passed through filter 28 to remove the precipitated sodium salts, NaCl and NaF. The filtrate is withdrawn from filter 28 through pipe 29 and is fed to mother liquor storage tank 30. This is necessary to permit surging for continuous operation. From storage tank 30 the filtrate is circulated through pipe 31 by means of pump 32 to hydrate still 33 wherein the filtrate is subjected to distillation.

Still 33 is operated so that a condition of dryness is never reached therein. This is accomplished by controlling the relative amounts of feed and take-off from the still. The take-off through pipe 35 from still 33 is maintained at a rate which is approximately 35% of the rate of feed to the still through pipe 31. The balance of material in still 33 is maintained by adjusting the rate of take-off of the distillate stream through pipe 35. The recycle stream contains FK hydrates saturated with NaCl and NaF, with some suspended salts and is returned to neutralizer 19 via pipe 34 for further treatment. Constant boiling distillable trihydrates of 5FK and 6FK which are removed from the top of still 33 through pipe 35 are fed into dehydrator 36.

The hydrate distillate entering dehydrator 36 is subjected to the dehydrating action of 100% $H_2SO_4$ at temperatures between about 90–100° C. to effect dehydration. The 100% $H_2SO_4$ dehydration agent is obtained and maintained by adding controlled amounts of $SO_3$ through feed line 37 to feed line 38 through which 96% $H_2SO_4$ is fed. The dehydrated product is then withdrawn from dehydrator 36 through pipe 39 and fed to a final product still 40 from which the sought-for anhydrous FK product is obtained. The bottoms from still 40 containing residual underfluorinated material (4FK and below) are recycled through pipe 41 to FK reactor 9 together with the bottoms from recycle still 12. The material balance for six (6) runs carried out in accordance with the above procedure is shown in following Table III. The runs are shown as Examples 1–6.

erately soluble in the FK trihydrates at the temperatures maintained in the hydrator pass through the 6FK hydrate and leave the hydrator through pipe 59 whereby they are fed to water scrubber 60. The scrubbed off-gases are vented off to the atmosphere. Aqueous HY is recovered from water scrubber 60 through pipe 61.

The hydrated 6FK material is contacted with a 50% aqueous solution of NaOH in neutralizer 58. The NaOH solution is fed to neutralizer 58 through feed pipe 62. A mechanical stirrer 63 is provided in neutralizer 58 to agitate the contents of the neutralizer. pH controller 64 continuously measures the pH in neutralizer 58 and automatically regulates feed control valve 65 to control the amount of NaOH fed to neutralizer 58 through feed pipe 62 so that pH in the neutralizer is maintained at about 5.9–6.3. The neutralization reaction is somewhat exothermic. Temperatures in the neutralizer are from about 25–40° C.

The neutralized reaction mixture from neutralizer 58 is withdrawn through pipe 66 and the mixture, which is in the form of a slurry, is fed to mother liquor storage tank 67. This is necessary to permit surging for continuous operation. From storage tank 67 the slurry is circulated through pipe 68 by means of pump 69 to still 70 wherein the slurry is subjected to distillation.

Still 70 is operated so that a condition of dryness is never reached therein. This is accomplished by controlling the relative amounts of feed and take-off from the still. The take-off from still 70 through pipe 71 is maintained at a rate which is approximately 35% of the rate of the feed to the still through pipe 68. The balance of mate-

TABLE III

| | Feed in grams | | | | | | | | |
|---|---|---|---|---|---|---|---|---|---|
| | Recycle liquid | Crude hydrate | | Filtration | | | Distillate from hydrate still 33 | | FK yield, percent |
| Example Number | | Weight | Total FK (5FK and 6FK) | Solids, gms. | Filtrate Weight, gms. | P.p.m. Cl⁻ | P.p.m. F⁻ | Weight, gms. | Total FK, gms. | |
| 1 | 463.3 | 218.6 | 153 | 52.7 | 671.1 | <2 | 5 | 195.9 | 116 | 76.3 |
| 2 | 464.9 | 218.6 | 153 | 59.5 | 672.5 | 2 | 4 | 199.2 | 125 | 81.4 |
| 3 | 464.6 | 218.6 | 153 | 42.2 | 684.6 | <2 | 3 | 213 | 135 | 87.5 |
| 4 | 462.5 | 218.6 | 153 | 67.4 | 655.5 | 2 | 4 | 183 | 113 | 74.3 |
| 5 | 463.1 | 218.6 | 153 | 53.5 | 675.1 | <2 | 3 | 205.5 | 127 | 82.3 |
| 6 | 462.0 | 218.6 | 153 | 52.7 | 664.7 | <2 | 2 | 189.8 | 119 | 77.8 |

EXAMPLES 7–10

Figure 2:
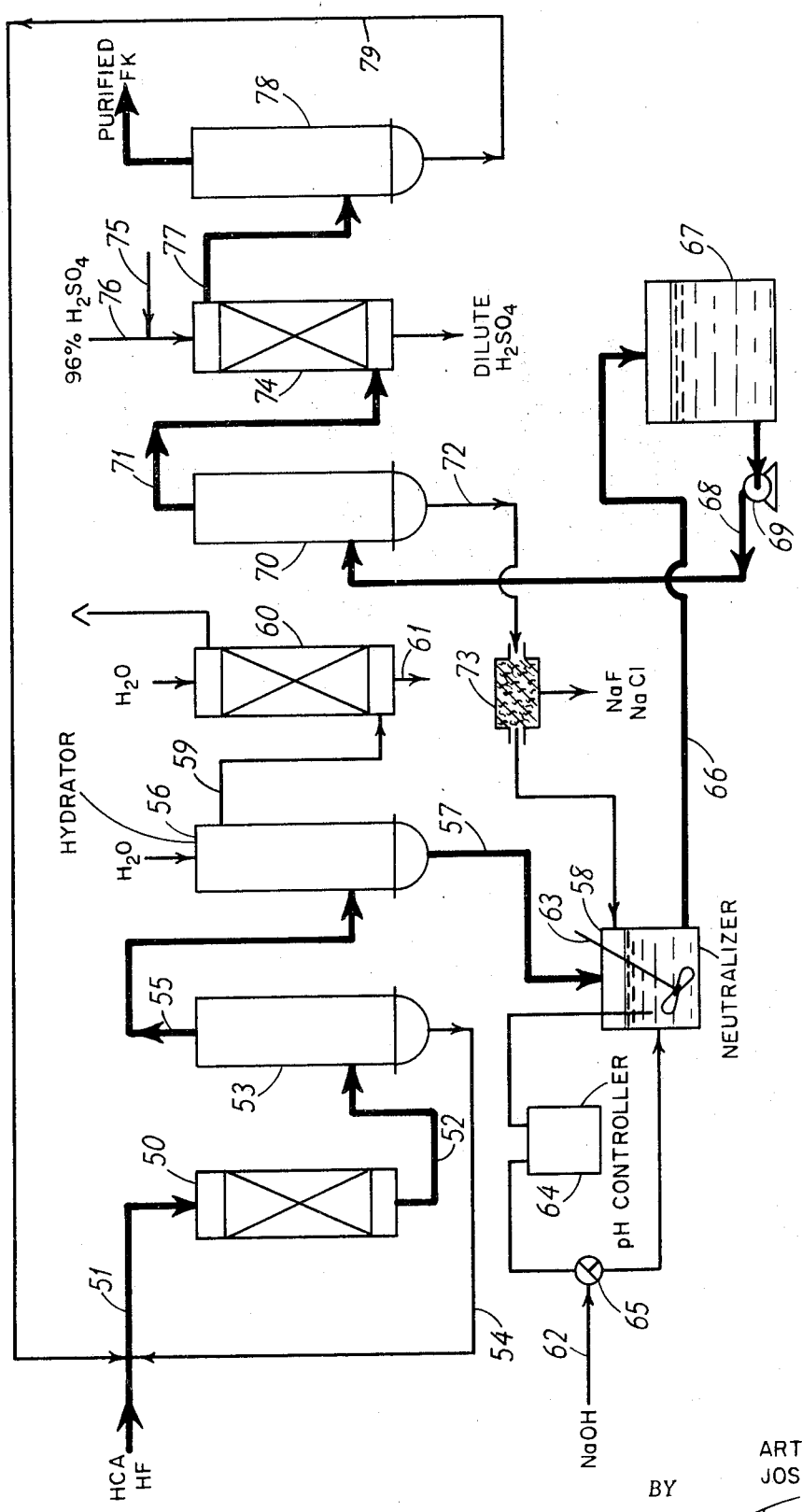
FIG. 2 is a schematic diagram illustrating the embodiment of the invention in which an HY containing 6FK mixture is purified by a procedure which includes as essential steps the following: hydrating the 6FK mixture to a 6FK·3H$_2$O mixture, neutralizing the 6FK·3H$_2$O mixture, distilling the neutralized 6FK·3H$_2$O mixture and dehydrating the distillate.

Referring to FIG. 2 of the drawings, a synthetic crude FK hydrate mixture is prepared as in Examples 1–6. Hexachloroacetone (HCA) and HF are fed to FK reactor 50 through pipe 51, wherein under the influence of a $Cr_2O_3$ catalyst, a product containing 6FK is produced. The FK mixture is fed through pipe 52 to recycle still 53 for the separation of 6FK material from underfluorinated FK material (5FK and below). The underfluorinated material is recycled through pipe 54 to FK reactor 50 for further fluorination. 6FK material is withdrawn from the top of recycle still 53 through pipe 55 and is fed to hydrator 56 wherein it is reacted, at temperatures between about 40–70° C., with sufficient water to form corresponding 6FK·3H₂O. 6FK·3H₂O is withdrawn from hydrator 56 through pipe 57 and is then fed to neutralizer 58. The hydrated 6FK mixture leaving hydrator 56 has approximately the following make-up:

| | Percent |
|---|---|
| 6FK | 60 |
| HCl | 4 |
| HF | 4 |
| H₂O | 32 |

Off-gases from the hydrator, comprising large quantities of halogen acids and organic impurities, being only modrial in still 70 is maintained by adjusting the rate of take-off of the distillate through pipe 71. The recycle stream through pipe 72 contains 6FK trihydrate saturated with NaCl and NaF, with some suspended salts. Before the recycle stream is fed into neutralizer 58 for further treatment, it is passed through filter 73 to remove the precipitated sodium salts, NaCl and NaF. Constant boiling distillable 6FK·3H₂O which is removed from the top of still 70 through pipe 71 is fed into dehydrator 74.

The 6FK·3H₂O distillate entering the dehydrator 74 is subjected to the dehydrating action of 100% $H_2SO_4$ at temperatures between about 90–100° C. to effect dehydration. The concentration of $H_2SO_4$ is obtained and maintained by adding $SO_3$ through feed line 75 to pipe 76 through which 96% $H_2SO_4$ is fed to dehydrator 74. The dehydrated product is then withdrawn from dehydrator 74 through pipe 77 and fed to a final product still 78 from which the sought-for 6FK product is obtained. The bottoms from still 78 containing residual underfluorinated material (5FK and below) are recycled through pipe 79 to FK reactor 50 together with the bottoms from recycle still 53. The material balance for four (4) runs carried out in accordance with the above procedure is shown in following Table IV. The runs are shown as Examples 7–10.

TABLE IV

| Example Number | Feed in grams | | | Neutralization, pH | Distillate from hydrate still 70 | | | | Filtration | | FK yield, percent |
|---|---|---|---|---|---|---|---|---|---|---|---|
| | Recycle liquid | Crude hydrate | | | P.p.m. Cl- | P.p.m. F- | Weight, grams | 6FK, gms. | Solids, grams | Filtrate weight, grams | |
| | | Weight | 6FK | | | | | | | | |
| 7 | 405.2 | 274.7 | 163 | 6.25 | 9 | <1 | 284.4 | 152 | 75.7 | 377.3 | 81 |
| 8 | 370.7 | 272.6 | 162 | 6.10 | 7 | <1 | 213.3 | 111 | 81.0 | 403.1 | 84 |
| 9 | 389.0 | 274.3 | 162 | 6.20 | 0 | <1 | 270.8 | 140 | 64.6 | 395.4 | 83 |
| 10 | 386.0 | 271.1 | 158 | 5.85 | 0 | <1 | 268.3 | 172 | 67.8 | 375.8 | 100 |

We claim:

1. The method for neutralizing halogen acid impurities contained in perhaloacetone mixtures which comprises contacting a mixture containing a perhaloacetone of the formula $C_3OCl_xF_{6-x}$, wherein $x$ is an integer from 0 to 1, and containing a halogen acid impurity of the formula HY, wherein Y is Cl or F, or mixture thereof, which comprises the steps of:

(a) contacting the mixture with liquid-phase water in an amount equivalent to provide a total of at least 1 mol of water per mol of perhaloacetone, while maintaining temperature such that any free water present is in the liquid phase, to evolve off quantities of HY and form a partially purified hydrated reaction mass containing recoverable perhaloacetone hydrate, (b) neutralizing HY in the partially purified hydrated reaction mass by reacting the same with a neutralizing agent of the formula MOH, wherein M is a member selected from the group consisting of an alkali metal and an alkaline earth metal, in an amount sufficient to react with substantially all of the HY present, while maintaining the pH of the reaction mixture during the neutralization in the range of about 3.5 to 7.0 by regulating the quantity of neutralizing agent added to the reaction mass, if a batch-wise operation, or by regulating the relative rates of addition of the neutralizing agent and the partially purified hydrated reaction mass to the neutralization zone, if a continuous operation, and (c) distilling the neutralized hydrated reaction mass to separate precipitated salts therefrom.

2. The method of claim 1 in which $x$ is 0.

3. The method of claim 1 in which $x$ is 1.

4. The method of claim 1 in which the neutralization step is carried out at temperatures between about 5–40° C.

5. The method of claim 1 in which the pH of the reaction mixture during the neutralization step is maintained between about 3.5 to 6.0.

6. The method of claim 1 in which the pH of the reaction mixture during the neutralization step is maintained between about 5.0–5.5.

7. The method of claim 1 in which the neutralization step is carried out at temperatures between about 5–40° C. and in which the pH of the reaction mixture during the neutralization step is maintained between about 3.5 to 6.0.

8. The method of claim 1 in which the neutralizing agent is a member selected from the group consisting of NaOH and KOH.

9. The method of claim 8 in which the neutralizing agent is NaOH.

10. The method of claim 9 in which the amount of liquid-phase water which is contacted with the mixture in accordance with step (a) does not exceed about 5.0 mols per mol of perhaloacetone present in the mixture.

11. The method of claim 9 in which $x$ is 0 and in which the amount of water which is contacted with the mixture in accordance with step (a) is such as to provide a molar ratio of water to perhaloacetone in the mixture in the range of about 2.8–3.5:1.

12. The method of claim 9 in which $x$ is 1 and in which the amount of water which is contacted with the mixture in accordance with step (a) is such as to provide a molar ratio of water to perhaloacetone in the mixture in the range of about 2.8–3.5:1.

13. The method of claim 9 in which the recoverable perhaloacetone hydrate described in step (a) has the formula $C_3OCl_xF_{6-x} \cdot nH_2O$ wherein $x$ is as defined and $n$ has a value from 1 to 3.

14. The method of claim 13 in which the amount of liquid-phase water which is contacted with the mixture in accordance with step (a) does not exceed about 5.0 mols per mol of perhaloacetone present in the mixture.

15. The method of claim 13 in which the amount of water which is contacted with the mixture in accordance with step (a) is such as to provide a molar ratio of water to perhaloacetone present in the mixture in the range of about 2.8–3.5:1.

16. The method of claim 13 in which the amount of water which is contacted with the mixture in accordance with step (a) is such as to provide a molar ratio of water to perhaloacetone present in the mixture in the range of about 3.1–3.2:1.

17. The method of claim 1 in which the recovered purified perhaloacetone hydrate distillate is dehydrated to the corresponding anhydrous perhaloacetone.

18. The method for neutralizing halogen acid impurities contained in perhaloacetone mixtures which comprises contacting a mixture containing a perhaloacetone of the formula $C_3OCl_xF_{x-6}$, wherein $x$ is an integer from 0 to 1, and containing halogen acid impurities of the formula HY, wherein Y is Cl or F, or mixtures thereof, which comprises the steps of:

(a) reacting the crude reaction mass with an alkaline earth metal chloride to convert a substantial proportion of the HF content therein to HCl, (b) contacting the resulting reaction mass with liquid-phase water in an amount equivalent to provide a total of at least 1 mol of water per mol of perhaloacetone, while maintaining temperature such that any free water present is in liquid phase, to evolve off quantities of HY and form a more purified hydrated reaction mass containing recoverable perhaloacetone hydrate, (c) neutralizing HY in the hydrated mixture by reacting the same with a neutralizing agent of the formula MOH, wherein M is a member selected from the group consisting of an alkali metal and an alkaline earth metal, in an amount sufficient to react with substantially all of the HY present, while maintaining the pH of the reaction mixture during the neutralization in the range of about 3.5 to 7.0 by regulating the quantity of neutralizing agent added to the reaction mass, if a batch-wise operation, or by regulating the relative rates of addition of the neutralizing agent and the partially purified hydrated reaction mass to the neutralization zone, if a continuous operation, and (d) distilling the neutralized hydrated mixture to separate precipitated salts therefrom.

19. The method of claim 18 in which $x$ is 0.

20. The method of claim 18 in which $x$ is 1.

21. The method of claim 18 in which the neutralizing agent is a member selected from the group consisting of NaOH and KOH.

22. The method of claim 21 in which the neutralizing agent is NaOH.

23. The method of claim 22 in which the pH is maintained between about 3.5–6.0.

24. The method of claim 23 in which the alkaline earth metal chloride employed is $CaCl_2$.

25. The method of claim 23 in which the amount of liquid-phase water which is contacted with the crude reaction mass in accordance with step (b) does not exceed about 5.0 mols per mol of perhaloacetone present in the crude reaction mass.

26. The method of claim 23 in which the amount of water which is contacted with the crude reaction mass in accordance with step (b) is such as to provide a molar ratio of water to perhaloacetone present in the crude reaction mass in the range of about 2.8–3.5:1.

27. The method of claim 23 in which the amount of water which is contacted with the crude reaction mass in accordance with step (b) is such as to provide a molar ratio of water to perhaloacetone present in the crude reaction mass in the range of about 3.1–3.2:1.

28. The method of claim 26 in which the pH is maintained between about 5.0–5.5.

29. The method of claim 18 in which the recovered purified perhaloacetone hydrate distillate is dehydrated to the corresponding anhydrous perhaloacetone.

References Cited

UNITED STATES PATENTS

| | | | |
|---|---|---|---|
| 2,116,893 | 5/1938 | Heisel | 260—593 |
| 3,351,665 | 11/1967 | Gilbert et al. | 260—593 |
| 3,433,838 | 3/1969 | Cunningham et al. | 260—593 |

FOREIGN PATENTS

| | | | |
|---|---|---|---|
| 558,286 | 12/1943 | Great Britain | 260—593 |

BERNARD HELFIN, Primary Examiner

W. B. LONE, Assistant Examiner

PO-1050
(5/69)

UNITED STATES PATENT OFFICE
CERTIFICATE OF CORRECTION

Patent No. 3,632,652           Dated January 4, 1972

Inventor(s) Arthur S. Chu and Joseph H. F. Loozen

It is certified that error appears in the above-identified patent and that said Letters Patent are hereby corrected as shown below:

Column 2, line 41, "purties" should be --purities--.

Column 3, 2nd formula, that part of the formula which reads:

$$\begin{array}{c} CF_2Cl \\ | \\ C\phantom{xx}-F_3 \\ | \\ OH \end{array}$$ should read $$\begin{array}{c} CF_2Cl \\ | \\ C\phantom{xx}-CF_3 \\ | \\ OH \end{array}$$

Column 7, line 43, the word "not" should be --no--.

Column 7, line 54, the word "a" should be --as--.

Column 7, line 60, "FW's" should be --FK's--.

Column 9, line 5, delete the second "the".

Column 10, line 54, the word "hereby" should be --whereby--.

Claim 18, line 4, that part of the formula reading "x-6" should read --6-x--.

Signed and sealed this 2nd day of January 1973.

(SEAL)
Attest:

EDWARD M. FLETCHER, JR.           ROBERT GOTTSCHALK
Attesting Officer                 Commissioner of Patents